(12) United States Patent
Hivet et al.

(10) Patent No.: US 12,725,402 B2
(45) Date of Patent: Sep. 1, 2026

(54) METHOD TO CLASSIFY QUENCH PATTERNS OF HEAT-TREATED COATED MINERAL GLASSES AND PREDICTS THE OPTICAL VISIBILITY THEREOF

(71) Applicant: LITESENTRY LLC, Burnsville, MN (US)

(72) Inventors: Romain Hivet, Saint-Ouen (FR); Davide Maccariello, Palaiseau (FR)

(73) Assignee: LITESENTRY LLC, Burnsville, MN (US)

(*) Notice: Subject to any disclaimer, the term of this patent is extended or adjusted under 35 U.S.C. 154(b) by 373 days.

(21) Appl. No.: 18/562,122

(22) PCT Filed: May 19, 2022

(86) PCT No.: PCT/EP2022/063609
§ 371 (c)(1),
(2) Date: Nov. 17, 2023

(87) PCT Pub. No.: WO2022/243450
PCT Pub. Date: Nov. 24, 2022

(65) Prior Publication Data
US 2024/0249502 A1 Jul. 25, 2024

(30) Foreign Application Priority Data
May 20, 2021 (EP) .................................... 21175024

(51) Int. Cl.
*G06V 10/764* (2022.01)
*G06T 5/20* (2006.01)
(Continued)

(52) U.S. Cl.
CPC .............. *G06V 10/764* (2022.01); *G06T 5/20* (2013.01); *G06T 5/94* (2024.01); *G06V 10/56* (2022.01)

(58) Field of Classification Search
CPC ........ G06V 10/764; G06V 10/56; G06T 5/20; G06T 5/94; G06T 7/44;
(Continued)

(56) References Cited

U.S. PATENT DOCUMENTS

2010/0007887 A1* 1/2010 Aldred ................ G01N 21/958 356/432
2020/0049619 A1* 2/2020 Long ................... G01N 33/386

FOREIGN PATENT DOCUMENTS

CN 120741507 B * 12/2025
DE 11 2011 102015 T5 7/2013
(Continued)

OTHER PUBLICATIONS

Dix, S., Müller, P., Schuler, C. et al. Digital image processing methods for the evaluation of optical anisotropy effects in tempered architectural glass using photoelastic measurements. Glass Struct Eng 6, 3-19 (2021). https://doi.org/10.1007/s40940-020-00145-3 (Year: 2021).*
(Continued)

*Primary Examiner* — Andrae S Allison
(74) *Attorney, Agent, or Firm* — Fredrikson & Byron, P.A.

(57) ABSTRACT

A computer implemented method classifies quench patterns of heat-treated uncoated or coated mineral glasses and predict the optical visibility thereof. The classification method takes as input a set of optical retardation image-maps of heat-treated coated mineral glasses, a set of optical visibility scores for quench patterns of the heat-treated uncoated or coated mineral glasses; a colour sensitivity factor of the heat-treated uncoated or coated mineral glasses, and provides as output a set of optimized values as parameters for components of an image processing pipeline to be applied to the optical retardation image-maps provided as input. The prediction method relies on an image processing pipeline set up with a set of optimized parameters which can be obtained with the classification.

15 Claims, 4 Drawing Sheets

(51) Int. Cl.
*G06T 5/94* (2024.01)
*G06V 10/56* (2022.01)

(58) Field of Classification Search
CPC . G06T 2207/10024; G06T 2207/20081; G06T 7/0004; G06F 18/22; G06F 18/2321; G01N 2021/8854; G01N 2021/8883
See application file for complete search history.

(56) References Cited

FOREIGN PATENT DOCUMENTS

| | | | |
|---|---|---|---|
| DE | 112011102015 | * | 7/2013 |
| EP | 3 722 265 | A1 | 10/2020 |
| WO | WO 2007/101963 | A2 | 9/2007 |
| WO | WO 2011/157815 | A1 | 12/2011 |
| WO | WO 2012/093238 | A1 | 7/2012 |
| WO | WO 2014/177798 | A1 | 11/2014 |
| WO | WO 2017/006030 | A1 | 1/2017 |
| WO | WO 2018/220328 | A1 | 12/2018 |
| WO | WO 2019/171002 | A1 | 9/2019 |

OTHER PUBLICATIONS

International Seach Report as issued in International Patent Application No. PCT/EP2022/063609, dated Sep. 20, 2022.

Dix, S., et al., "Digital image processing methods for the evaluation of optical anisotropy effects in tempered architectural glass using photoelastic measurements," Glass Structures & Engineering (Year: 2021) 6:3-19.

* cited by examiner

POVS
0
1
2
3
4
5
6
OVS
0
1
2
3
4
5
6

METHOD TO CLASSIFY QUENCH PATTERNS OF HEAT-TREATED COATED MINERAL GLASSES AND PREDICTS THE OPTICAL VISIBILITY THEREOF

CROSS-REFERENCE TO RELATED APPLICATIONS

This application is the U.S. National Stage of PCT/EP2022/063609, filed May 19, 2022, which in turn claims priority to European patent application number 21175024.5 filed May 20, 2021. The content of these applications are incorporated herein by reference in their entireties.

TECHNICAL FIELD

The invention pertains to computer implemented methods to classify quench patterns of heat-treated uncoated or coated mineral glasses and predict the optical visibility thereof.

TECHNICAL BACKGROUND

Quench pattern, also called 'strain pattern', is an optical phenomenon occurring in coated or uncoated heat-strengthened and tempered glasses which manifests by a pattern of iridescence or shadows.

Quench patterns are caused by small variations in the density of glass which are due the rapid cooling, generally air cooling, of the heat-treating process of glasses. These small variations induce local strains in the glass which in turn lead to birefringence or optical anisotropy. The intensity of this optical phenomenon may vary from glass to glass and may depend upon many factors such as the glass thickness or the cooling conditions of the heat-treating process.

According to section 7.5 of ASTM C1048, quench patterns in heat-strengthened and tempered glasses are not normally visible. They are characteristic of these kinds of glasses and should not be mistaken as discoloration or not uniform tint or colour.

Occasionally, quench patterns, may be observed under certain lighting conditions, in particular under polarized light, for instance under a blue sky or under incident light which previously reflected by water surface or by another glass surface.

According to current industry standards, e.g., ASTM C1048, quench patterns are not considered as glass defects and are not a cause for rejection. Quench patterns do not alter the structural integrity of the glass, and thus have no consequence on the mechanical and chemical properties of the glass. They are also not considered to have aesthetic consequences on final glass products.

However, as aesthetic considerations take now important part in the management of increasingly architectural projects, there is a growing concern upon quench patterns which may potentially have negative impact on the final rendering of glazed facades of buildings. For instance, quench patterns, that were not considered or viewed as critical during lab-scale investigations or on mock-ups under site conditions and surrounding landscape closed to those of the final facades of the buildings, may become critical flaws on large, glazed façades of building when they are exposed to incident light from multiples lighting sources in final conditions, i.e., blue sky and multi reflected lights from the glazed of surrounding buildings.

Furthermore, while quench patterns may have acceptable aesthetical consequences on uncoated heat-strengthened and tempered glasses, same quench patterns may be enhanced and become more visible on coated glasses. Coatings, such as thin films coatings, may refract differently the incident light so that said quench patterns may be revealed through colour variations.

In this context, quality criteria regarding for both uncoated and coated heat-strengthened and tempered glasses for certain architectural applications begin to become increasingly stringent. The art provides different methods and devices to analyse quench patterns in a glazing.

WO 2011/157815 A1 [AGC GLASS EUROPE [BE]] 22 Dec. 2011 discloses a method for analysing quench pattern in glazing, wherein local stresses are measured by photoclasticimetry, and compared to criteria in a reference database comprising statistically established optical visibility scores assessed by human observers.

WO 2018/220328 A1 [SAINT GOBAIN GLASS FRANCE [FR]] 6 Dec. 2018 discloses a device and a method for quench pattern in glazing wherein quench pattern are imaged through measure of optical retardation.

EP 3 722 265 A1 [SAINT GOBAIN [FR]] 11 Apr. 2019 discloses a computer implemented method for evaluating the sensitivity of glazing to form quench pattern, wherein a colour sensitivity factor is calculated from colour variation, in transmission or reflexion, between an area of the glazing which does not induce optical phase shift and an area of the glazing which induces such shift.

SUMMARY OF THE INVENTION

Technical Problem

The International Commission for Illumination (CIE) showed that colour perception among human observers is relatively homogeneous, and the CIE colour space provides a reliable qualitative and quantitative relationship between the electromagnetic visible spectrum and the colours perceived by human observers.

However, establishing a scoring method to assess the optical quality of uncoated or coated heat-strengthened and tempered glasses regarding the visibility of quench pattern still remains challenging, in particular for finding out the technical rationales behind the scores provided by a given sample of observers, i.e., architects, glass quality experts, final customers.

Indeed, methods which rely on databases providing relationships between optical features of glazing and visibility scores of quench pattern are unreliable since said databases are only effective for given products and the relationships are often based on human decisions in order to establishing which optical features, and at what level, correspond to which visibility scores. Furthermore, such databases may have rapidly become complex as the number of optical features that are considered and/or the number of visibility scores increase. In other words, such methods may fail as a re-producible and polyvalent method to classify quench pattern based on the optical visibility scores thereof assessed by human observers and/or to predict the visibility thereof in a term of human perception.

Therefore, it is still of interest for glass manufacturers to have a reliable and easy to use method to assess the optical quality of uncoated or coated heat-strengthened and tempered glasses regarding the visibility of quench pattern. The method may be ideally independent of the glass product under investigation. Not only such method may be a tool to define quality criteria for glass products by which it can be assesses whether a glass product fulfils requirements for particular application regarding the visibility of quench patterns, but it may also help to evaluate the performances of the heat-treating processes of the glass manufacturing lines and acting onto them to reduce the formation of quench patterns.

Solution to the Technical Problem

A first aspect of the invention provides a computer implemented classification method as described in claim 1, dependent claims being advantageous embodiments.

The method classifies quench patterns of heat-treated uncoated or coated mineral glass according to their optical visibility. The mineral glass may be a glass sheet, in particular a transparent glass sheet.

The method takes as input a set of optical retardation image-maps of heat-treated coated mineral glasses, a set of optical visibility scores for quench patterns of said heat-treated uncoated or coated mineral glasses; and a colour sensitivity factor of the heat-treated uncoated or coated mineral glasses.

In heat-treated mineral glass, optical retardation describes the change in the polarization of the illuminating light. Optical retardation is well described in the art and several methods exist to extract them, e.g., ASTM C1901 standard, WO 2018/220328 A1 [SAINT GOBAIN GLASS FRANCE [FR]] 6 Dec. 2018, or Dix et al., Digital image processing methods for the evaluation of optical anisotropy effects in tempered architectural glass using photoelastic measurements standard, Glass Structures & Engineering (2021) 6:3-19, which provide examples of methods to acquire optical retardation image map of mineral glass sheet.

The optical visibility scores are assessed by human observers according to an arbitrary scale, so that freedom is provided for the choice in number of marks for that scale, in particular depending on the application for the glass products.

The colour sensitivity factor relates to the regions-to-regions colour difference gradient of said heat-treated uncoated or coated mineral glasses from their anisotropy. Examples of colour sensitivity factor are described in EP 3 722 265 A1 [SAINT GOBAIN [FR]] 11 Apr. 2019.

The method provides as output a set of optimized values as parameters for components of an image processing pipeline to be applied to the optical retardation image-maps provided as input. The image processing pipeline when set up with the optimized parameters provides in turn a reliable, substantially linear relationship between the optical retardation image-maps of heat-treated coated mineral glasses and the optical visibility scores. It can thereafter be used as a classifier for quench patterns of heat-treated coated mineral glass regarding to their optical visibility.

In this respect, a second aspect of the invention provides a computer implemented prediction method as described in claim 13, the dependent claims being advantageous embodiments. The method relies on an image processing pipeline set up with a set of optimized parameters which can be obtained with a method according to the first aspect of the invention.

The method predicts the optical visibility of quench patterns of heat-treated coated mineral glasses by taking as input an optical retardation map of a heat-treated coated mineral glass and a colour sensitivity factor of the coating of the heat-treated coated mineral glasses and providing as output an optical visibility score for said heat-treated coated mineral glass.

A third aspect of the invention provides a data processing system and a computer program to carry out the methods according to the first and second aspect of the invention.

Advantages of the Invention

A first outstanding benefit of the invention is to provide a qualitative and quantitative scoring method for the visibility of quench patterns of heat-treated uncoated or coated mineral glasses, which is based on measurable optical properties thereof. Therefore, a technical framework is provided to define quality criteria for coated heat-treated glasses regarding the visibility quench patterns while, thanks to its heuristic nature, it alleviates the need for a time and R&D resources consuming investigation to establish a physical model from optical properties for the glass products that still require to be identified.

A second outstanding benefit of the invention is that the method is independent of the nature of the mineral glass and/or the nature of the coating if the mineral glass is coated. This particular benefit is achieved thanks to the fact that the image processing pipeline of the classification method allows to compute a single parameter from the optical retardation image maps, which encompasses all the relevant technical and physical properties of each uncoated or coated mineral glasses and allows to compare the computed singles parameters and match them to visibility scores for quench pattern independently of the nature the mineral glass and/or the coating if any. In the second aspect of the invention, this benefit allows to compare different glass products, i.e., different uncoated mineral glasses and/or different coated mineral glasses and/or different coatings, regarding the optical visibility of quench patterns.

A third benefit of the invention is that the set optimised values provided by the classification method may indirectly give some insights on particular features of the glass product which may have an influence on the optical visibility scores assessed by human observers and provided as input. These insights may help to identify the features onto which actions may be undergone to improve the optical quality of the glass products.

A fourth benefit of the invention is that it can be used as a predictive tool to qualify glass products depending on their final application. In particular, the invention allows to confirm that coated heat-treated glasses fulfil given requirements of standards for aesthetical applications. In turn, the invention may also allow to evaluate the performances of heat-treating processes in glass manufacturing regarding the formation of quench patterns and may allow glass manufactures to act onto them to reduce potential scraps.

Additional features and advantages of the embodiments will be set forth in the detailed description and examples, and in part will be readily apparent to those skilled in the art from that description and examples or recognized by practicing the embodiments described herein, including the detailed description, the examples, and the appended drawings.

DETAILED DESCRIPTION OF EMBODIMENTS

Figure 1:
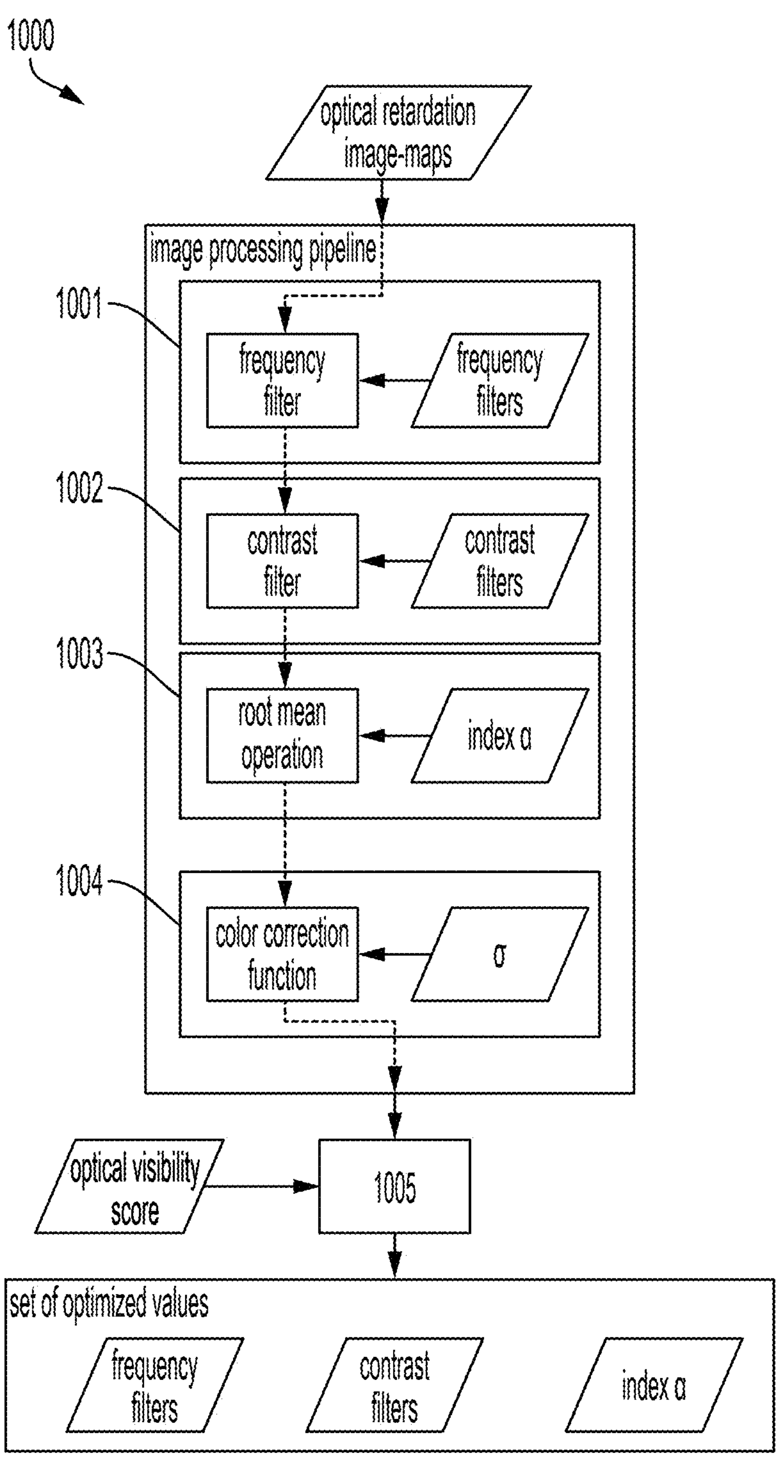
FIG. 1 is a data flow diagram of a computer implemented classification method according to the first aspect of the invention.

With reference to FIG. 1, in an embodiment of the invention, there is provided a computer implemented classification method (1000) to classify quench patterns of heat-treated uncoated or coated mineral glasses;

wherein said method (1000) takes as input a set of optical retardation image maps ORIM of heat-treated coated mineral glasses, a set of optical visibility scores OVS for quench patterns of said heat-treated uncoated or coated mineral glasses; and a colour sensitivity factor σ of the heat-treated un coated or coated mineral glasses;

wherein said optical visibility scores OVS are assessed by human observers according to an arbitrary scale for the quench patterns of said heat-treated uncoated or coated mineral glasses under given lighting and observation conditions;

wherein said colour sensitivity factor σ represents the regions to regions colour difference gradient of said heat-treated uncoated or coated mineral glasses from their anisotropy;

wherein said method provides as output a set of optimized values SOV for each component of an image processing pipeline IPP to be applied on said optical retardation image-maps ORIM; and wherein said method comprises the following steps:

a) defining (1001) a frequency filter FF with a neighbourhood size FFs as a first component of said image processing pipeline IPP;

b) defining (1002) a contrast filter CF with a neighbourhood size CFs as a second component of said image processing pipeline IPP;

c) defining (1003) a root mean operation RMO with an index a over the image contrast as a third component of said image processing pipeline IPP;

d) defining (1004) a colour correction function CCF as a fourth component of said image processing pipeline IPP, said colour correction function is a multiplication of the colour sensitivity factor σ by a trigonometric function of a root mean operation RMO;

e) performing (1005) a regression operation between said colour correction function CCF and the set of optical visibility scores OVS through the varying parameters FFs, CFs, α while the image processing pipeline IPP is applied over the set of optical retardation image maps ORIM, the obtained values for said varying parameters being the set of optimized values SOV for each component of said image processing pipeline IPP.

The frequency filter FF is the first component of the image processing pipeline. It aims to reduce the contribution of high frequency periodical features of the quench patterns that are not observable by the naked eyes of the human observers. The FFs parameter may be expressed in the scale used to define the image size or the image dimensions. It may be expressed in pixel or in any suitable system, e.g., metric system, for length measurement.

In preferred embodiments, the frequency filter FF is a local mean filter, a local average filter or a local kernel filter. The optimized value obtained for the neighbourhood size FFs parameter at step (e) for said embodiments may represent the cut-off frequency for non-observable high frequency periodical features in the respect of the arbitrary scale used for the optical visibility scores provided as input. This cut-off frequency may provide advantageous information regarding the most relevant features contributing to the visibility of quench pattern through the optical retardation image provided as output.

In visual perception, the ability of human to distinguish features from a background depends on the contrast of said features, i.e., the luminance amplitude of each feature compared to the average background luminance. Same considerations apply in image recognition as the contrast of features in an image is materialized by the value of each pixel forming representing said features compared to the average value of pixel in the whole.

In this respect, the contrast filter CF, as second component of the image processing pipeline, aims to enhance the areas of the optical retardation image in which the variations of the retardation are the most important since the high contrast areas of the image contains the most recognizable features.

In preferred embodiments, the contrast filter CF is a local maximum filter, a local threshold filter, a local subtract mean filter, a local subtract mean percentile filter or a local maximum-minimum difference filter. The optimized value obtained for the neighbourhood size CFs at step (e) for said embodiments may then be representative of the average size of the areas of the image containing recognizable features.

The root mean operation RMO is the third component of the image processing pipeline. It allows to extract a single representative quantity of the image contrast which is based on a statistical evaluation of said contrast. Through this single representative quantity, the multi-dimensionality of the optical retardation in an optical retardation image map is reduced into a single global parameter for characterizing the optical retardation.

In an example embodiment, the root mean operation RMO may be expressed as follows:

$$RMO = \sqrt[\alpha]{\sum_{i,j} \frac{C_{i,j}^{\alpha}}{N}}$$

with α real number, $$C_{i,j}^{\alpha}$$

the contrast value of the (i,j) pixel of the optical retardation image ORI and N is the number of pixels in said image.

As explained above, the index α is a varying parameter in the regression operation at step (e). During the regression operation, this parameter is adjusted to improve the reproduction of the optical visual scores OVS provided as input. After the regression operation, if the index α is close to one, the root mean operation RMO identifies to mean operation. If the index α is greater than one, the root mean operation RMO emphasizes areas of the optical retardation image maps ORIM which contains points with higher value of contrast versus areas of the same size with the same mean contrast but more uniformly distributed.

The colour correction function CCF is the fourth component of the image processing pipeline. In the context of the invention, the 'colour correction function CCF' should not be interpreted as a mathematical function but as a varying parameter calculated from the multiplication of the colour sensitivity factor σ, a numeral value provided as input, by a trigonometric function of the root mean operation RMO, an indirect varying parameter by the varying parameter index a as described above. The colour correction function may thus be interpreted as a composite varying parameter.

In the context of the disclosure, the expression 'colour correction function' and 'colour correction parameter' are then to be considered equivalent and may be used one for other equivalently The CCF expresses the variation of the optical retardation weighted by the colour difference which is due to anisotropy to provide a quench pattern the visibility of which depends on said colour difference.

In preferred embodiments, the trigonometric function is sine-squared function, cosine-squared function or a squared function. An example of squared function may a first order Taylor polynomial of a sine or cosine function.

In a more preferred embodiment, the trigonometric function is sine square and the CCF function may be expressed as follows: $CCF=\sigma\times(\sin(RMO))^2$ According to the invention, the regression operation at step (c) aims to model the relationship between colour correction function CCF and the set of optical visibility scores OVS by estimating the parameters FFs, CFs, α while the image processing pipeline IPP is applied over the set of optical retardation image maps ORIM.

The regression operation models a relationship between dependent variables, the set of optical visibility scores OVS, and independent variables, the set of optical retardation image maps ORIM, through the varying parameters FFs, CFs, a of the image processing pipeline IPP. In other words, the image processing pipeline IPP with the varying parameters FFs, CFs, a may be interpreted as a model to fit on the input data, i.e., set of optical visibility scores OVS and the set of optical retardation image maps ORIM, in the regression operation.

The values of the estimated parameters form the set of optimized values for each component of said image processing pipeline IPP.

Any adapted regression method may be used for the regression operation. In preferred embodiment, the regression operation is a linear least square regression, which is relatively easy to implement and provides good fitting results.

As afore mentioned, the colour sensitivity factor relates to the regions-to-regions colour difference gradient of the heat-treated uncoated or coated mineral glasses which comes from their anisotropy. It may be evaluated in transmission, or in reflection from one and/or both sides of glass sheets.

In some embodiments, any examples of colour sensitivity factor and method of evaluation which are described in EP 3 722 265 A1 [SAINT GOBAIN [FR]] 11 Apr. 2019 may be used in the method according the first aspect of the invention.

In advantageous embodiment, the colour sensitivity factor is defined as $$\sigma = \lim_{\delta\to 0} \frac{\Delta E(R, T_{iso}^p, R, T_{aniso}^p)}{\sin^2\delta},$$

where $$\Delta E(R, T_{iso}^p, R, T_{aniso}^p)$$

is the colour difference of the reflected (R) or transmitted (T) light R.

$$T_{iso}^p$$

on a non-dephasing zone of a glass coated with said coating and the reflected (R) or transmitted (T) light R, $$T_{aniso}^p$$

on a dephasing zone of same said glass with an optical phase shift δ under p-polarized light.

The colour difference may be advantageously calculated according to the CIE standards. The CIE provides a general framework for establishing reliable qualitative and quantitative relationship between the electromagnetic visible spectrum and the colours perceived by human observers. Therefore, the CIE standards may be valuable as it allows to link the visual appearance of mineral glass sheets as perceived by human observers to a measurable and normalized colour difference.

In some advantageous embodiments, the colour difference is the CIEDE2000 colour difference under CIE standard conditions. The definition of CIEDE2000 is more precise than the CIE1974 definition since it allows to specify the colour difference between two colour stimuli perceived as belonging to reflecting or transmitting objects and solves the perceptual uniformity issue, i.e., the set of points in the CIELAB space whose distance is less than the just-noticeable-difference threshold. A direct consequence is that the CIEDE2000 colour difference is much more representative of the colour differences which are perceived by human depending on the observation conditions.

Briefly and schematically, the discrimination ellipses in the CIELAB colour space are more elongated for CIEDE2000 colour difference than for the CIE1976 colour difference. In the CIEDE2000, the elongation is provided by additional compensation parameters—a hue rotation term, a compensation for neutral colours, a compensation for lightness, compensation for chroma and a compensation for hue—which are associated to correction factors. These correction factors depend on the experimental conditions of observation and on the application. The CIEDE2000 colour difference is detailed in the ISO/CIE 11664-6 standard.

In certain embodiments, the correction factors of the CIEDE2000 colour difference are set as varying parameters in step e). As the correction factors depend on the experimental conditions of observation and on the application, their use as varying parameters provide more freedom in the regression operation, in particular when the experimental conditions of acquisition for the optical retardation image maps ORIM provided as input depart from the reference CIE standard conditions.

In alternative embodiments, in particular when the optical retardation image maps ORIM provided as input were acquired in the reference CIE standard conditions, the correction factors of the CIEDE2000 colour difference are set to unity.

Figure 2:
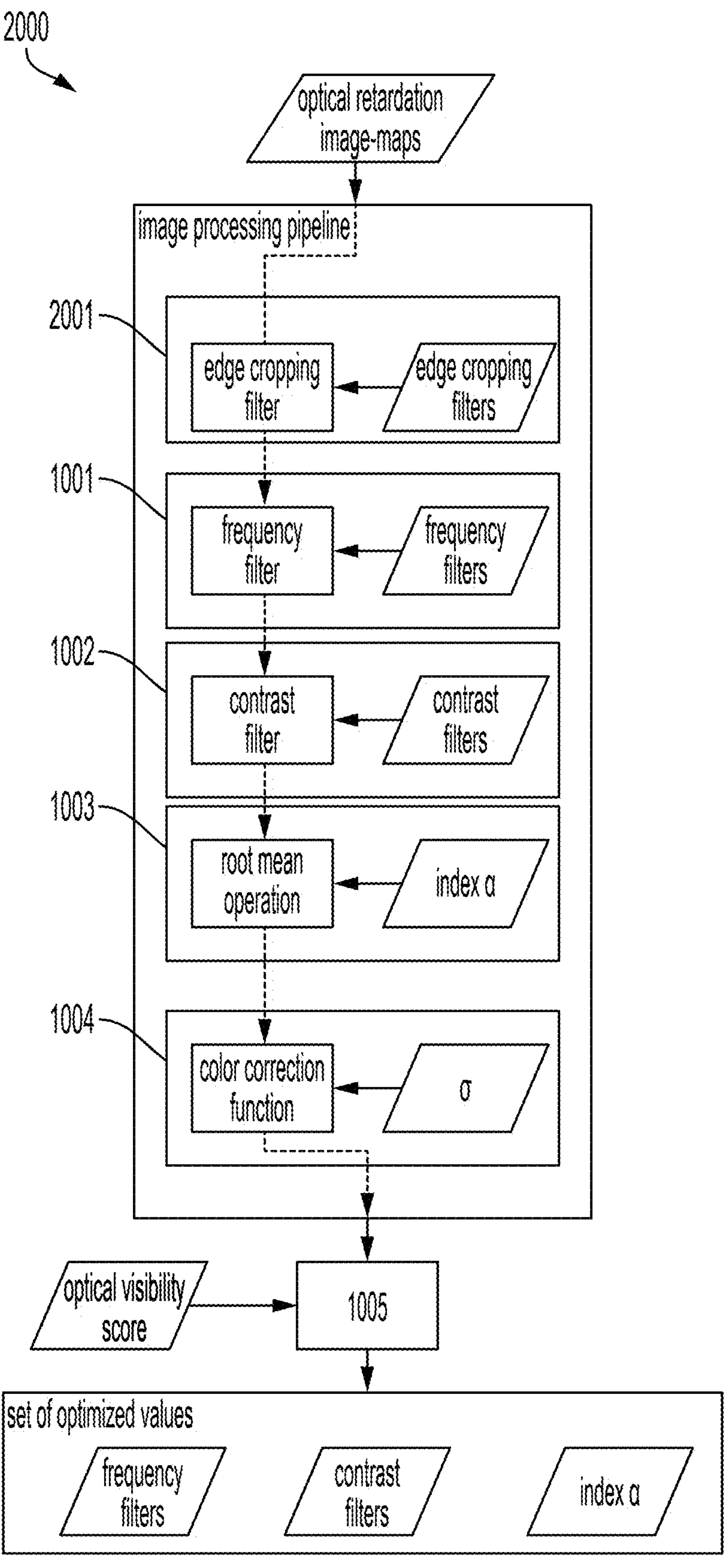
FIG. 2 is a data flow diagram of a particular embodiment of a computer implemented classification method according to the first aspect of the invention.

With reference to FIG. 2, in an embodiment of the invention, the method further comprises, before step a), a step of defining (2001) an edge cropping filter ECF with a neighbourhood size ECFs as a component of said image processing pipeline IPP. In some applications, part of glass sheets, e.g., their edges or rims, may be completely concealed from observers once it is included or installed in a supporting structure. For example, when a sheet of glass is part of window glazing, the window frame usually encloses or covers the whole rims so that said rims are completely out of view. In this configuration, the quench pattern in the concealed part of glass sheets is not visible and the corresponding regions of the optical retardation image maps may be neglected and cropped. The window frame may also conceal only part of the rim or edge, e.g., one, two or three of the four edges or rims of the glass sheet.

The value of neighbourhood size CFFs may be a matter of choice and may depend on the area of the edges or rims of the glass sheet which may be covered or concealed by the supporting structure. The neighbourhood size CFFs may be the width of the supporting structure which covers the rims. This width is usually expressed into the corresponding pixels on the optical retardation image maps ORIM.

As explained above, the optical visibility scores are assessed by human observers according to an arbitrary scale. Freedom is then provided for the choice in number of marks for that scale, in particular depending on the application for the glass products.

The optical visibility scores are assessed for the quench patterns of heat-treated uncoated or coated mineral glasses under given lighting and observation conditions. The given lighting and observation conditions are also a matter of choice and may also depend on the application for the glass products. In preferred embodiments, the given lighting observation conditions are CIE standard conditions. The CIE conditions, being standardized and not as versatile as arbitrary ones, may reduce uncertainties and improve the regression operation in the method. They may also provide more re-producible frameworks for the assessments of visibility scores by human observers, and, in this context, be more reliable to compare campaigns of assessment for glass sheets which are manufactured at different time.

The method is adapted for heat-treated uncoated mineral glass sheets. It is also well adapted for coated mineral glass sheet; the coating may be on one or both sides of the glass sheet. The coating may be of any kind. It may be organic and/or inorganic, i.e., mineral. It may provide additional optical properties to the mineral glass sheet.

In particular, advantageous embodiments, for which the method according to the invention provides reliable and noticeable results, the heat-treated mineral glass is a coated glass and the coating is a thin films coating comprising at least metallic functional layer, in particular an IR and/or UV reflecting layer. The method according to the invention provides reliable results for such coating.

Figure 3:
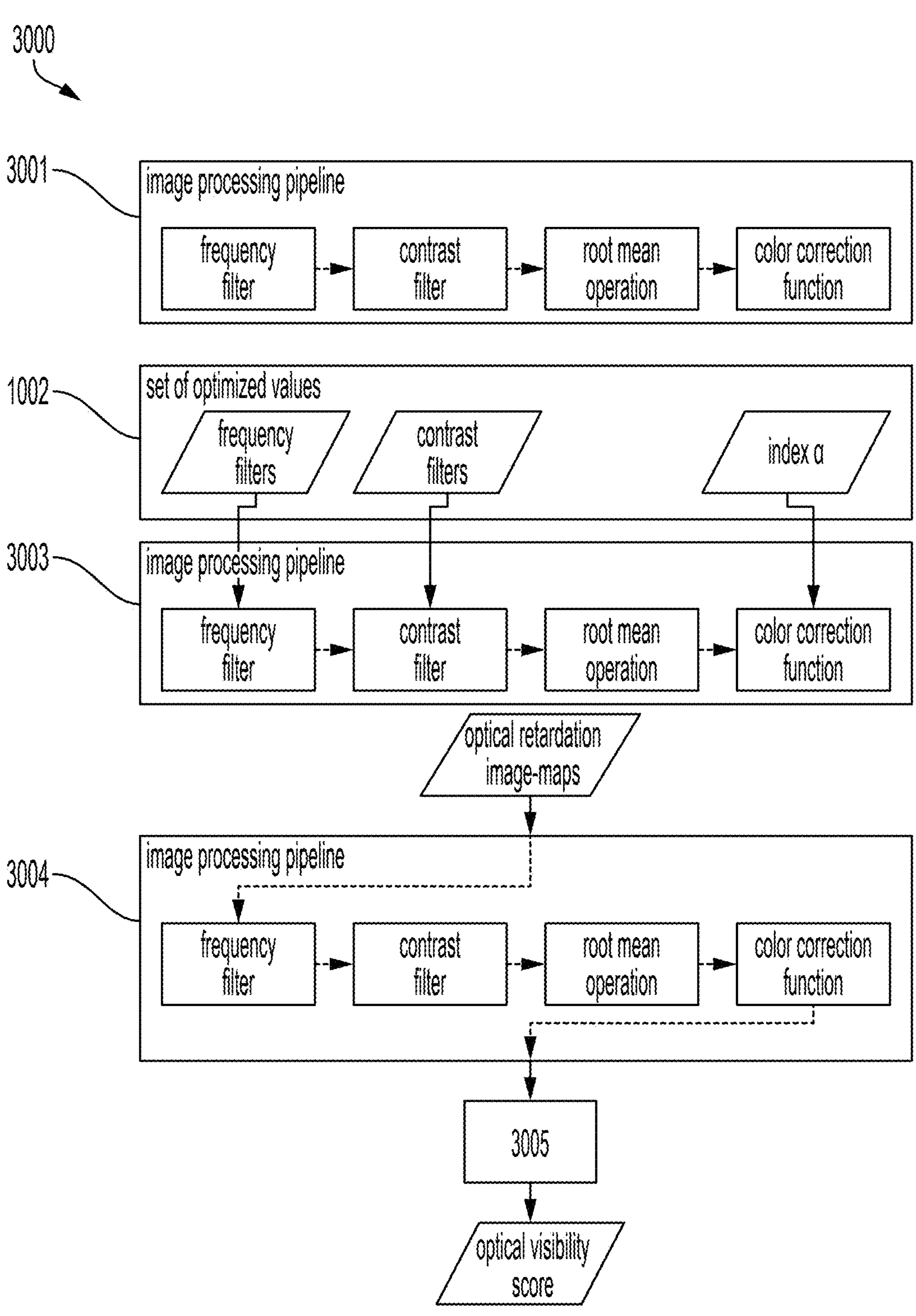
FIG. 3 is a data flow diagram of a computer implemented prediction method according to the second aspect of the invention.

With reference to FIG. 3, in another embodiment of the invention, there is provided a computer implemented prediction method (3000) to predict the optical visibility of quench patterns of heat-treated coated mineral glasses, wherein said method takes as input an optical retardation image map ORIM of a heat-treated coated mineral glass and a colour sensitivity factor of the coating of the heat-treated coated mineral glasses, wherein said method provides as output an optical visibility score OVS for said heat-treated coated mineral glass, and wherein said method comprises the following steps:

a) defining (3001) an image processing pipeline IPP which is the image processing pipeline of a classification method according to any of the embodiments of the first aspect of the invention;

b) computing (3002) a set of optimized values SOV for each component of said image processing pipeline IPP with the corresponding classification method according to any of the embodiments of the first aspect of the invention;

c) setting (3003) the each component of said image processing pipeline IPP with the computed set of optimized values SOV;

d) providing (3004) the optical retardation image map ORIM of a heat-treated coated mineral glass to the image processing pipeline IPP set with the computed set of optimized values SOV;

c) computing (3005) an optical visibility score OVS for said heat-treated coated mineral glass by processing the optical retardation image map ORIM of said heat-treated coated mineral glass though the image processing pipeline IPP.

A third aspect of the invention provides a data processing system comprising means for carrying out a method according to any one of the embodiments of the first and second aspect of the invention, and a computer program comprising instructions which, when executed by a computer, cause the computer to carry out a method according to any one of embodiments of the first and second aspect of the invention.

The data processing system comprises means for carrying out a method according to any of the embodiments of the first and second aspect of the invention. Example of means for carrying out the method may be a device which can be instructed to carry out sequences of arithmetic or logical operations automatically to perform tasks or actions. Such device, also called computer, can comprise one or more Central Processing Unit (CPU) and at least a controller device that are adapted to perform those operations. It can further comprise other electronic components like input/output interfaces, non-volatile or volatile storage devices 3003, and buses that are communication systems for the data transfer between components inside a computer, or between computers. One of the input/output devices can be user interface for human-machine interaction, for example graphical user interface to display human understandable information.

As calculation may require a lot of computational power to process substantial amounts of data, the data processing system may advantageously comprise one or more Graphical Processing Units (GPU) whose parallel structure makes them more efficient than CPU, in particular for image processing in ray tracing.

For the computer program, any kind of programming language, either compiled or interpreted, may be used to implement the steps of the method of the invention. The computer program may be part of a software solution, i.e., part of a collection of executable instructions, code, scripts, or the like and/or databases.

In certain embodiments, there is provided a computer-readable medium comprising instructions which, when executed by a computer, cause the computer to carry out the method according to any of the embodiments of the first and second aspect of the invention.

The computer-readable storage may be preferably a non-volatile storage or memory, for example hard disk drive or solid-state drive. The computer-readable storage may be removable storage media or a non-removable storage media as part of a computer.

Alternatively, the computer-readable storage may be a volatile memory inside a removable media.

The computer-readable storage may be part of a computer used as a server from which executable instructions can be downloaded and, when they are executed by a computer, cause the computer to carry out a method according to any of the embodiments described herein.

Alternatively, the program may be implemented in a distributed computing environment, e.g., cloud computing. The instructions can be executed on the server to which client computers can connect and provide encoded data as inputs to the method. Once data are processed, the output can be downloaded and decoded onto the client computer or directly send, for example, as instructions. This kind of implementation can be advantageous as it can be realised in a distributed computing environment such as a cloud computing solution.

EXAMPLES

Five different samples, S1-S5, of heat-treated coated sheet of mineral glass are manufactured. Different thin films coating comprising three Ag-based metallic functional layers separated from each other by dielectric modules were deposited by magnetron sputtering on a sheet of transparent sodalime glass before to be tempered at a temperature around 500° C. The five coatings were chosen in examples of the patent applications WO 2007/101963 A2 [SAINT GOBAIN GLASS FRANCE [FR]] 23 Sep. 2007, WO 2012/093238 A1 [SAINT GOBAIN GLASS FRANCE [FR]] 12 Jul. 2012, WO 2014/177798 A1 [SAINT GOBAIN GLASS FRANCE [FR]] 6 Nov. 2014, WO 2017/006030 A1 [SAINT GOBAIN GLASS FRANCE [FR]] 12 Jan. 2017 and WO 2019/171002 A1 [SAINT GOBAIN GLASS FRANCE [FR]] 12 Sep. 2019.

The colour sensitivity factor $\sigma$ of each sample is computed according to the methods described in EP 3 722 265 A1 [SAINT GOBAIN [FR]] 11 Apr. 2019, in particular according to the following formula:

$$\sigma = \lim_{\delta \to 0} \frac{\Delta E(R^p_{iso}, R^p_{aniso})}{\sin^2 \delta},$$

where $$\Delta E(R^p_{iso}, R^p_{aniso})$$

is the colour difference of the reflected (R) light $$R^p_{iso}$$

on a non-dephasing zone of a glass coated with said coating and the reflected (R) light $$R^p_{aniso}$$

on a dephasing zone of same said glass with an optical phase shift $\delta$ under p-polarized light. The colour difference is CIEDE2000 colour difference under CIE standard condition. The correction parameters, $k_L$, $k_C$, $k_H$, of the CIEDE2000 are fixed as varying parameters for the classification operation. The pre-computed values, i.e., without correction factors, of the colour sensitivity factor are reported in table 1.

TABLE 1

| | S1 | S2 | S3 | S4 | S5 |
|---|---|---|---|---|---|
| $\sigma$ | 4.7 | 5.0 | 5.6 | 3.5 | 8.1 |

Fifty 60×80 $cm^2$ sized panels were manufactured for each sample. The panels are then photographed to form a set of at least fifty pictures for each sample. The pictures are acquired at a distance of 3 meters at an approximate 60° angle while the panels being oriented at an approximate 45° in respect to the tempering direction and exposed to a p-polarized incident light at 70%.

Once acquired, the photographs are showed to a set of human observers to assess the optical visibility of the quench pattern for each photograph in a scoring scale from 1 to 5, where 1 corresponds to non-optically visible quench patterns, 2 to quench patterns only visible to expert observers, 3 to slightly visible but acceptable quench patterns, 4 to visible but still acceptable quench patterns and 5 to visible and unacceptable quench patterns. As the five samples are aimed to be used in window glazing, a 2.5 cm-width rim corresponding to the width of the window frame is defined around the panels and disregarded during the assessment.

The optical retardation image maps ORIM of the 5×50 panels were acquired with the method described in WO 2018/220328 A1 [SAINT GOBAIN GLASS FRANCE [FR]] 6 Dec. 2018.

The quench patterns of the panels are classified with a classification method according to the first aspect of the invention which further comprises, before step a), for the definition of the image processing pipeline, a step of defining an edge cropping filter ECF with a neighbourhood size ECFs of 20px corresponding to the 2.5 cm width rim. The correction parameters, $k_L$, $k_C$, $k_H$, of the CIEDE2000 are fixed as varying parameters in the colour sensitivity factor $\sigma$.

The set of optimized values for each component of the image processing pipeline are reported in the table 2.

TABLE 2

| | FFs | CFs | $\alpha$ | $k_L$ | $k_C$ | $k_H$ |
|---|---|---|---|---|---|---|
| $\sigma$ | 40 | 170 | 4 | 1 | 0.7 | 2 |

Figures 4, 5:
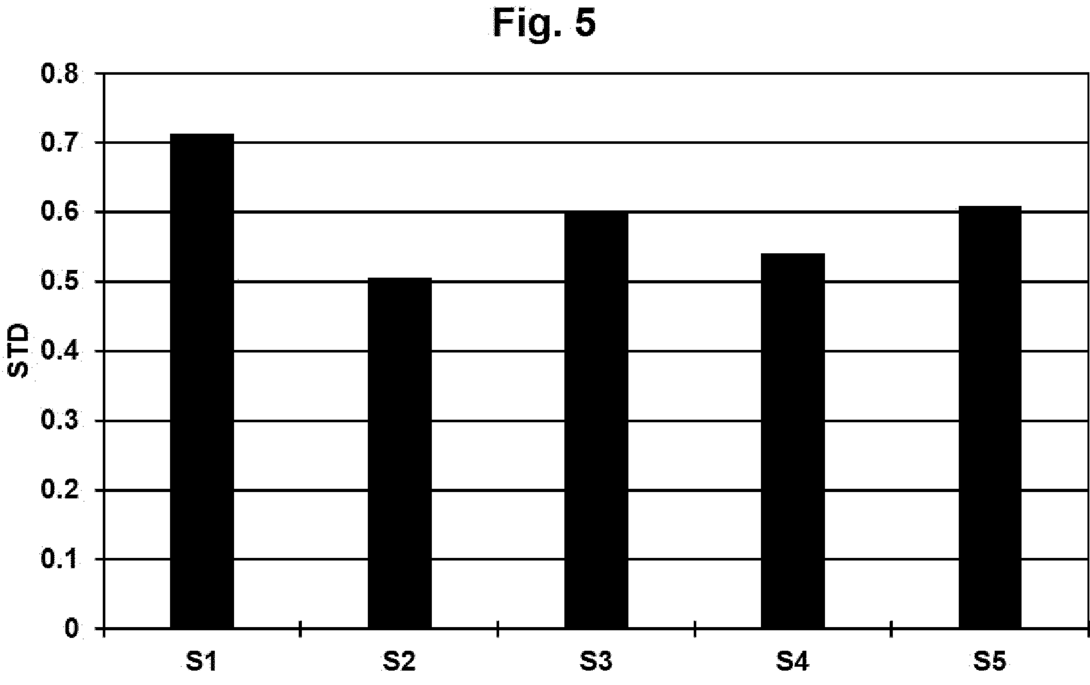
FIG. 4 is a plot of predicted optical visibility scores of quench patterns versus optical visibility scores assessed by human observers for example heat-treated coated mineral glasses.
FIG. 5 is a plot of the mean deviation of predicted optical visibility scores of quench patterns for example heat-treated coated mineral glasses.

FIG. 4 is a plot of the mean values of the predicted optical visibility scores POVS of quench patterns, after classification, versus optical visibility scores OVS assessed by human observers provided as input.

The prediction coefficient $R^2$ after classification is 0.91, which shows an accurate agreement between the predicted scores POVS during the classification and the set of scores from human observers OVS.

FIG. 5 is a plot of the mean deviation (STD) of the predicted optical visibility scores of quench patterns for the five sample S1 to S5. The plot shows that the mean deviation between the five samples is quite constant, with a mean value around 0.6. These results indicate that the prediction score is independent of the nature of glass products.

The examples clearly demonstrate that the methods according to all aspects of the invention provide a qualitative and quantitative scoring method for the visibility of quench patterns of heat-treated mineral glasses. The methods are also independent of the nature of the mineral glass and/or the nature of the coating so that different glass products can be compared to each other regarding the optical visibility of quench patterns.

CITATION LIST

Patent Literature

WO 2011/157815 A1 [AGC GLASS EUROPE [BE]] 22 Dec. 2011.

WO 2018/220328 A1 [SAINT GOBAIN GLASS FRANCE [FR]] 6 Dec. 2018.

EP 3 722 265 A1 [SAINT GOBAIN [FR]] 11 Apr. 2019.

WO 2007/101963 A2 [SAINT GOBAIN GLASS FRANCE [FR]] 23 Sep. 2007.

WO 2012/093238 A1 [SAINT GOBAIN GLASS FRANCE [FR]] 12 Jul. 2012.

WO 2014/177798 A1 [SAINT GOBAIN GLASS FRANCE [FR]] 6 Nov. 2014.

WO 2017/006030 A1 [SAINT GOBAIN GLASS FRANCE [FR]] 12 Jan. 2017.

WO 2019/171002 A1 [SAINT GOBAIN GLASS FRANCE [FR]] 12 Sep. 2019.

Non-Patent Literature

ASTM C1048—Standard Specification for Heat-Strengthened and Fully Tempered Flat Glass ASTM C1901—Standard Test Method for Measuring Optical Retardation in Flat Architectural Glass Dix et al., Digital image processing methods for the evaluation of optical anisotropy effects in tempered architectural glass using photoelastic measurements standard, Glass Structures & Engineering (2021) 6:3-19

ISO/CIE 11664-6:2014 Colorimetry—Part 6: CIEDE2000 Colour-difference formula.

The invention claimed is:

1. A computer implemented classification method to classify quench patterns of heat-treated uncoated or coated mineral glasses;

wherein said method takes as input a set of optical retardation image maps (ORIM) of heat-treated coated mineral glasses, a set of optical visibility scores (OVS) for quench patterns of said heat-treated uncoated or coated mineral glasses; and a colour sensitivity factor σ of the heat-treated uncoated or coated mineral glasses;

wherein said optical visibility scores OVS are assessed by human observers according to an arbitrary scale for the quench patterns of said heat-treated uncoated or coated mineral glasses under given lighting and observation conditions;

wherein said colour sensitivity factor σ represents regions-to-regions colour difference gradient of said heat-treated uncoated or coated mineral glasses from their anisotropy;

wherein said method provides as output a set of optimized values (SOV) for each component of an image processing pipeline (IPP) to be applied on said optical retardation image-maps ORIM; and wherein said method comprises the following steps:

a) defining a frequency filter (FF) with a neighbourhood size (FFs) as a first component of said image processing pipeline IPP;

b) defining a contrast filter (CF) with a neighbourhood size (CFs) as a second component of said image processing pipeline IPP;

c) defining a root mean operation (RMO) with an index a over the image contrast as a third component of said image processing pipeline IPP;

d) defining a colour correction parameter (CCF) as a fourth component of said image processing pipeline IPP, said colour correction function is a multiplication of the colour sensitivity factor σ by a trigonometric function of said root mean operation RMO;

e) performing a regression operation between said colour correction parameter CCF and the set of optical visibility scores OVS through the varying parameters FFs, CFs, α while the image processing pipeline IPP is applied over the set of optical retardation image maps ORIM, the obtained values for said varying parameters being the set of optimized values SOV for each component of said image processing pipeline IPP.

2. The computer implemented classification method according to claim 1, wherein the frequency filter FF is a local mean filter, a local average filter or a local kernel filter.

3. The computer implemented classification method according to claim 1, wherein the contrast filter CF is a local maximum filter, a local threshold filter, a local subtract mean filter, a local subtract mean percentile filter or a local maximum-minimum difference filter.

4. The computer implemented classification method according to claim 1, wherein said method further comprises, before step a), a step of defining an edge cropping filter ECF with a neighbourhood size ECFs as a component of said image processing pipeline IPP.

5. The computer implemented classification method according to claim 1, wherein the regression operation is a linear least square regression.

6. The computer implemented classification method according to claim 1, wherein the trigonometric function is sine-squared function, cosine-squared function or a squared function.

7. The computer implemented classification method according to claim 1, wherein the colour sensitivity factor is defined as $$\sigma = \lim_{\delta \to 0} \frac{\Delta E(R, T_{iso}^{p}, R, T_{aniso}^{p})}{\sin^2 \delta},$$

where $$\Delta E(R, T_{iso}^{p}, R, T_{aniso}^{p})$$

is the colour difference of the reflected (R) or transmitted (T) light R, $$T_{iso}^{p}$$

on a non-dephasing zone or a glass coated with said coating and the reflected (R) or transmitted (T) light R, $$T^{p}_{aniso}$$

on a dephasing zone or same said glass with an optical phase shift δ under p-polarized light.

8. The computer implemented classification method according to claim 7, wherein the colour difference is the CIEDE2000 colour difference under CIE standard conditions.

9. The computer implemented classification method according to claim 8, wherein the correction factors of the CIEDE2000 colour difference are set as varying parameters in step e).

10. The computer implemented classification method according to claim 8, wherein the correction factors of the CIEDE2000 colour difference are set to unity.

11. The computer implemented classification method according to claim 1, wherein said given lighting observation conditions are CIE standard conditions.

12. The computer implemented classification method according to claim 1, wherein the heat-treated mineral glass is a coated glass and the coating is a thin films coating comprising at least metallic functional layer, in particular an IR and/or UV reflecting layer.

13. A computer implemented prediction method to predict the optical visibility of quench patterns of heat-treated coated mineral glasses, wherein said method takes as input an optical retardation image map ORIM of a heat-treated coated mineral glass and a colour sensitivity factor of the coating of the heat-treated coated mineral glasses, wherein said method provides as output an optical visibility score OVS for said heat-treated coated mineral glass, and wherein said method comprises the following steps:

a) defining an image processing pipeline IPP which is the image processing pipeline of a classification method according to claim 1;

b) computing a set of optimized values SOV for each component of said image processing pipeline IPP with the corresponding classification method;

c) setting each component of said image processing pipeline IPP with the computed set of optimized values SOV;

d) providing the optical retardation image map ORIM of a heat-treated coated mineral glass to the image processing pipeline IPP set with the computed set of optimized values SOV;

c) computing an optical visibility score OVS for said heat-treated coated mineral glass by processing the optical retardation image map ORIM of said heat-treated coated mineral glass though the image processing pipeline IPP.

14. A data processing system comprising means for carrying out a method according to claim 1.

15. A non-transitory computer readable medium comprising instructions which, when executed by a computer, cause the computer to carry out a method according to claim 1.

* * * * *